US008212708B2

(12) United States Patent
Nozoe et al.

(10) Patent No.: US 8,212,708 B2
(45) Date of Patent: Jul. 3, 2012

(54) REMOTE CONTROLLER

(75) Inventors: Isao Nozoe, Fukui (JP); Taisaku Maeda, Fukui (JP)

(73) Assignee: Panasonic Corporation, Osaka (JP)

( * ) Notice: Subject to any disclaimer, the term of this patent is extended or adjusted under 35 U.S.C. 154(b) by 500 days.

(21) Appl. No.: 12/410,536

(22) Filed: Mar. 25, 2009

(65) Prior Publication Data

US 2009/0243910 A1 Oct. 1, 2009

(30) Foreign Application Priority Data

Mar. 31, 2008 (JP) ................................ 2008-091110

(51) Int. Cl.
*G08C 19/00* (2006.01)
*H04L 17/02* (2006.01)

(52) U.S. Cl. ........................................................ 341/176

(58) Field of Classification Search ................... 341/176
See application file for complete search history.

(56) References Cited

U.S. PATENT DOCUMENTS

2006/0009175 A1* 1/2006 Hsu .............................. 455/128

FOREIGN PATENT DOCUMENTS

JP 05-198154 A 8/1993
JP 2005-347194 A 12/2005

* cited by examiner

*Primary Examiner* — Hal Kaplan
(74) *Attorney, Agent, or Firm* — RatnerPrestia

(57) ABSTRACT

The remote controller includes: a casing with a battery holder provided to house a battery; a lid to cover the battery holder of the casing and provided with a latch-hook extending downward at its end; a switch-contact to carry out electrical switching conducted by the operation panel; a controller to send remote signals from transmitter in response to the electrical switching of the switch-contact; a plurality of protrusions provided symmetrically on the front and rear surfaces of the latch-hook on the lid; and latch-pawls provided on the casing internally to engage with the protrusions. The remote controller can hold the lid reliably and additionally can open/shut the lid easily.

8 Claims, 6 Drawing Sheets

REMOTE CONTROLLER

FIELD OF THE INVENTION

The present invention relates to a remote controller used to operate a wide variety of electronic equipment from a distance.

BACKGROUND ART

A variety of electronic equipment such as audio/video or air conditioner have been increasing in recent years which is controlled by a battery-operated remote controller to operate various functions from a distance.

Japanese Patent Unexamined Publication No. 2005-347194 (patent document 1) has disclosed an example of such a conventional remote controller, which is described below with reference to FIGS. 5 to 7B.

FIG. 5 shows a cross-sectional view of the conventional remote controller, and FIG. 6 shows an exploded perspective view of the same. In the drawings, a generally arc-shaped recessed battery holder 1A is formed on the top (hereafter referred to top/bottom or right/left directions shown in the drawings) surface of generally box-shaped casing 1 formed from insulating resins. Battery holder 1A houses a plurality of batteries 2 in parallel.

The right end of generally plate-like lid 3 formed from insulating resins engages with the right end of battery holder 1A. Generally U-shaped latch-hook 3A is provided at the left end of lid 3. A plurality of protrusions 3B provided at both right/left sides on the front surface of latch-hook 3A engages with the inner bottom of casing 1 resiliently to cover battery holder 1A of casing 1 with lid 3.

Operation panel 4 formed from rubber or the like is provided with a plurality of keys 4A coupled each other via upper generally domed thin-walled member. Movable contacts formed from carbon or the like (not shown) are provided on the top surface of keys 4A.

A plurality of fixed contacts formed from carbon or the like (not shown) are provided on the bottom surface of wiring board 5 which has a plurality of wiring patterns (not shown) on its top and bottom surfaces. The fixed contacts are disposed facing the movable contacts provided on the top surface of keys 4A with a predetermined clearance. This forms a plurality of switch-contacts 6 eventually.

Transmitter 7 formed of LEDs or the like to send remote signals and controller 9 formed of micro-computers or the like are provided on the top and bottom surfaces of wiring board 5. Two batteries 2 are connected to controller 8 via coiled terminals 9. A plurality of fixed contacts and transmitter 7 are connected to controller 8 electrically via wiring patterns.

Generally box-shaped cover 10 formed from insulating resins covers the bottom of casing 1. A plurality of keys 4A of operation panel 4 extend movably vertically from a plurality of open holes provided on the bottom surface of cover 10 to complete the remote controller.

With the above configuration, when a user presses a certain key 4A, pointing the remote controller at electronic equipment, the domed thin-walled member will be deformed elastically to turn upward. This allows movable contacts on the top surface of key 4A to contact with a plurality of fixed contacts, causing switch-contacts 6 to perform electrical switching. As a result, in response to the electrical switching, controller 8 sends infrared signals from transmitter 7 to electronic equipment. This performs for instance power switching or volume controlling for electronic equipment from a distance.

To replace a battery for such remote controller, the user should press an edge of generally U-shaped latch-hook 3A at the left end of lid 3 rightward to bend it by for instance a tip of thumb as shown in the cross-sectional view in FIG. 7A. This releases protrusions 3B provided on the front surface out of inner bottom of casing 1. Lid 3 will be able to turn pivotally with its right end to act as a fulcrum as shown in FIG. 7B. Battery holder 1A housing two batteries in parallel can be opened to replace the batteries.

Namely, when pressing operation panel 4 to operate the remote controller, lid 3 is kept closed by engaging protrusions 3B provided on the front surface with inner bottom of casing 1 resiliently due to elastic deformation property of generally U-shaped latch-hook 3A at the left end of lid 3. On the other hand, upon replacing the battery, lid 3 is opened by a relatively easy way of pressing the edge of latch-hook 3A using a fingertip to bend it rightward and to release latch-hook 3A out of inner bottom of casing 1. As described above, the configuration enables lid 3 to open/shut easily by a relatively simple way using a single fingertip.

In the conventional remote controller, in other words, the user can open lid 3 easily by a relatively simple way of pressing the edge of latch-hook 3A rightward using a single fingertip. However, there has been a problem that lid 3 tends to open and the batteries drop off easily because of it in a case of having pressed the edge of latch-hook 3A mistakenly when intending to press operation panel 4 or in a case of latch-hook 3A has been pressed happeningly when the remote controller is slipped out of fingers.

SUMMARY OF THE INVENTION

The present invention is to solve the conventional problem and to provide a remote controller that can hold a lid firmly but can open/shut the lid with an easy operation.

The remote controller includes: a casing with a battery holder provided to house a battery; a lid to cover the battery holder of the casing and provided with a latch-hook extending downward at its end; a switch-contact to conduct electrical switching by the operation of operation panel; a controller to send remote signals from transmitter in response to the electrical switching of the switch-contact; a plurality of protrusions provided symmetrically on the front and rear surfaces of the latch-hook on the lid; and latch-pawls provided on the casing internally to engage with the protrusions.

The configuration can provide the remote controller that can hold the lid firmly and can perform an easy opening/shutting operation.

DETAILED DESCRIPTION OF THE INVENTION

Figure 1A:
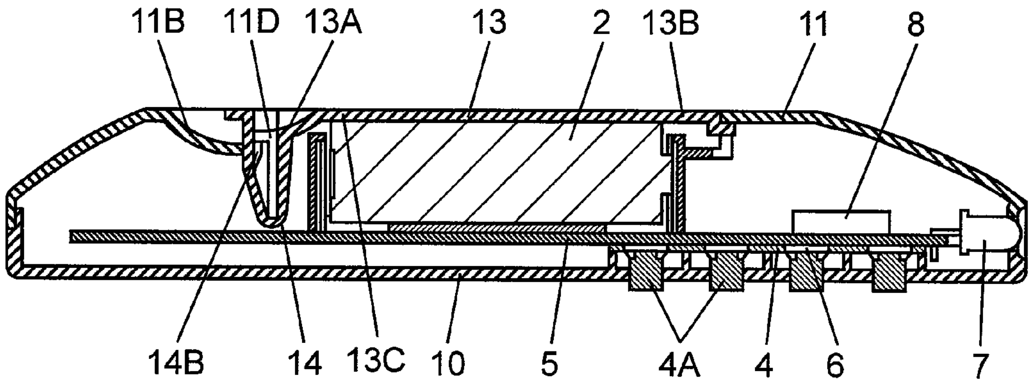
FIG. 1A shows a cross-sectional view of a remote controller in accordance with an exemplary embodiment of the present invention.

The exemplary embodiment of the present invention is described with reference to the drawings. The top/bottom or right/left directions used below are referred to directions shown in the drawings also in the following exemplary embodiment.

Figure 1B:
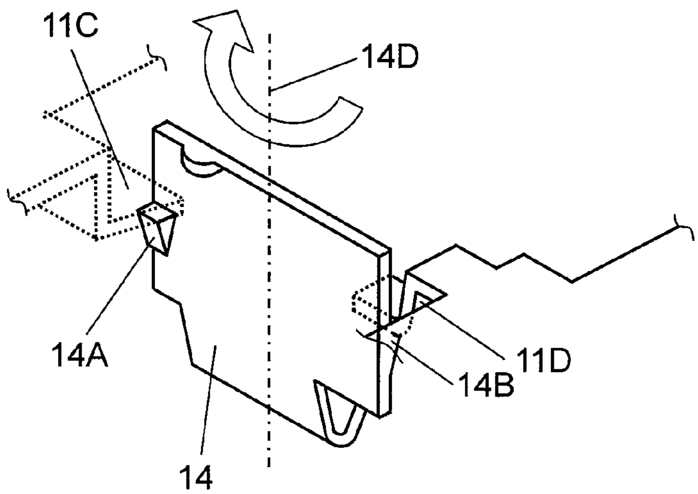
FIG. 1B shows a partially enlarged perspective view of the remote controller in accordance with the exemplary embodiment.
Figure 2:
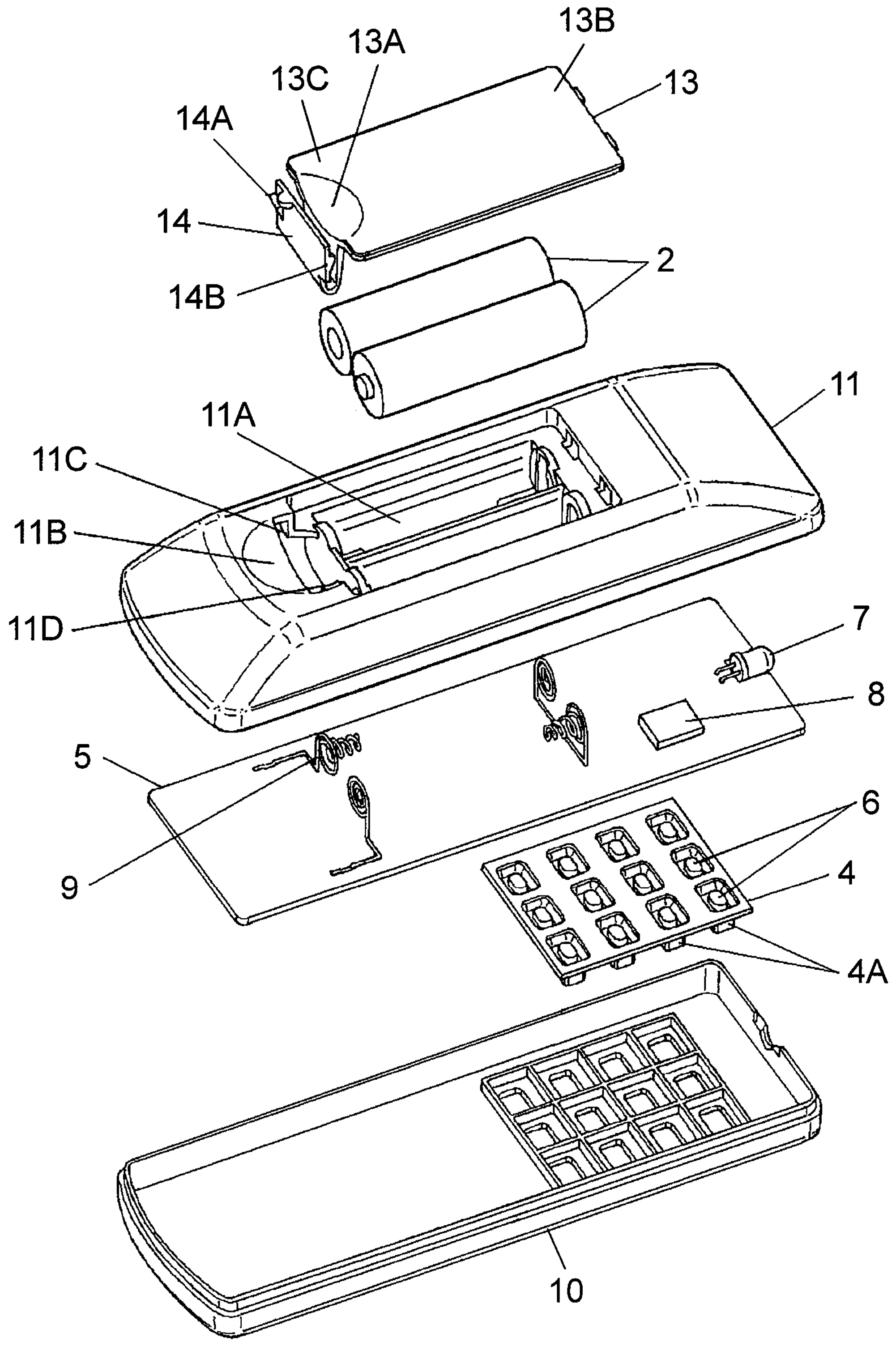
FIG. 2 shows an exploded perspective view of the remote controller in accordance with the exemplary embodiment.

FIG. 1A shows a cross-sectional view of a remote controller in accordance with an exemplary embodiment of the present invention. FIG. 1B shows a partially enlarged perspective view of the same. FIG. 2 shows an exploded perspective view of the same. In FIGS. 1A to 2, recessed arc-shaped battery holder 11A is formed on the top surface of generally box-shaped casing 11 formed from insulating resins such as polystyrene or ABS. A plurality of batteries 2 are housed in parallel in battery holder 11A. A downward arc-shaped dent 11B is provided at the left end of battery holder 11A on the top surface of casing 1.

The right end 13B of generally plate like lid 13 formed from insulating resins is engaged at the right end of battery holder 11A of casing 11. On the left end 13C of lid 13, a downward arc-shaped dent 13A is provided like dent 11B on casing 11. Additionally, latch-hook 14 that extends leftwards and is bent into generally U-shaped is provided at the left end 13*b*(C) of lid 13.

A plurality of projections 14A and 14B are provided on point-symmetric positions on the front and rear surfaces of latch-hook 14 with an axis of rotation 14D for twisting latch-hook 14 to act as a center. Projections 14A and 14B are engaged resiliently with latch-pawls 11C and 11D provided on inner bottom of casing 11. Protrusions 14A and 14B engage with latch-pawls 11C and 11D resiliently so as to allow lid 13 to cover battery holder 11A of casing 11.

A plurality of keys 4A coupled with each other on upper generally domed thin-walled member are provided on operation panel 4 formed from rubber, elastomer or the like. Movable contacts formed from carbon or the like (not shown) are provided on the top surfaces of keys 4A.

A plurality of wiring patterns formed of copper strips or the like (not shown) are provided on the top and bottom surfaces of wiring board 5 formed from paper-reinforced phenol or glass-reinforced epoxy. A plurality of fixed contacts formed from carbon or the like (not shown) are provided on the bottom surface of wiring board 5. The fixed contacts are disposed facing the movable contacts on the top surfaces of keys 4A with a predetermined clearance, thereby forming a plurality of switch-contacts 6.

Transmitter 7 formed of LEDs or the like to send remote signals and controller 8 formed of micro-computers or the like are provided on the top and bottom surfaces of wiring board 5. Batteries 2 are connected to controller 8 via coiled terminals 9. A plurality of fixed contacts and transmitter 7 are connected to controller 8 electrically via wiring patterns.

Generally box-shaped cover 10 formed from insulating resins covers the bottom of casing 11. A plurality of keys 4A on operation panel 4 extend movably vertically from a plurality of open holes provided on the bottom of cover 10, thus completing the remote controller.

With the above configuration, when a user presses a certain key 4A, pointing the remote controller at electronic equipment, the domed thin-walled member will be deformed elastically to turn upward. This allows movable contacts on the top surface of key 4A to contact with a plurality of fixed contacts, causing switch-contacts 6 to perform electrical switching. In response to the electrical switching, therefore, controller 8 sends infrared remote signals from transmitter 7 to electronic equipment. This allows the remote controller to operate electronic equipment for instance for power on/off or volume control from a distance.

Figure 3A:
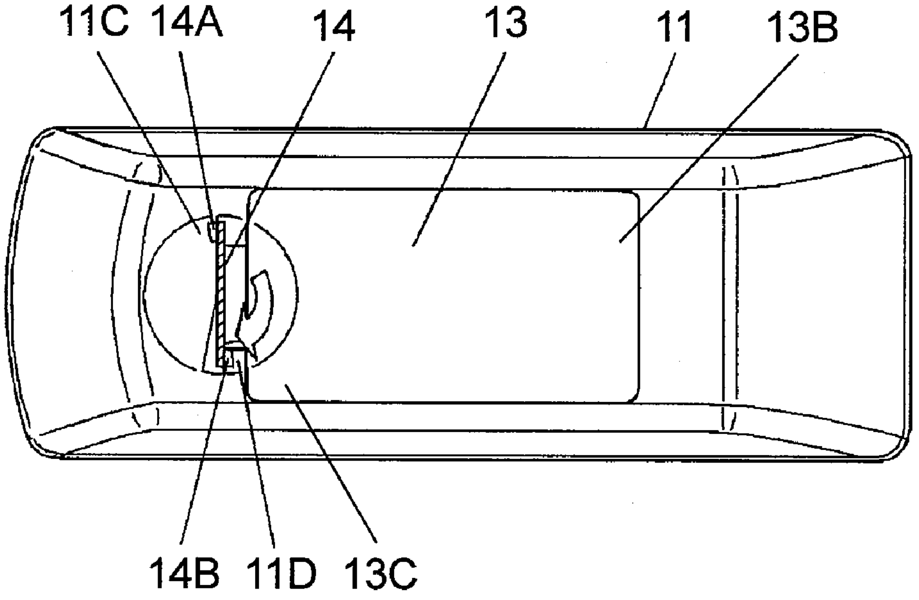
FIG. 3A shows the first plan view to explain the operation of the remote controller in accordance with the exemplary embodiment.

To replace a battery for such a remote controller, the user should turn latch-hook 14 at the left end 13C of lid 13 for instance clockwise pinching an edge of the latch-hook 14 by two fingers of for instance an index finger and a thumb as shown in the plan view in FIG. 3A.

Figure 3B:
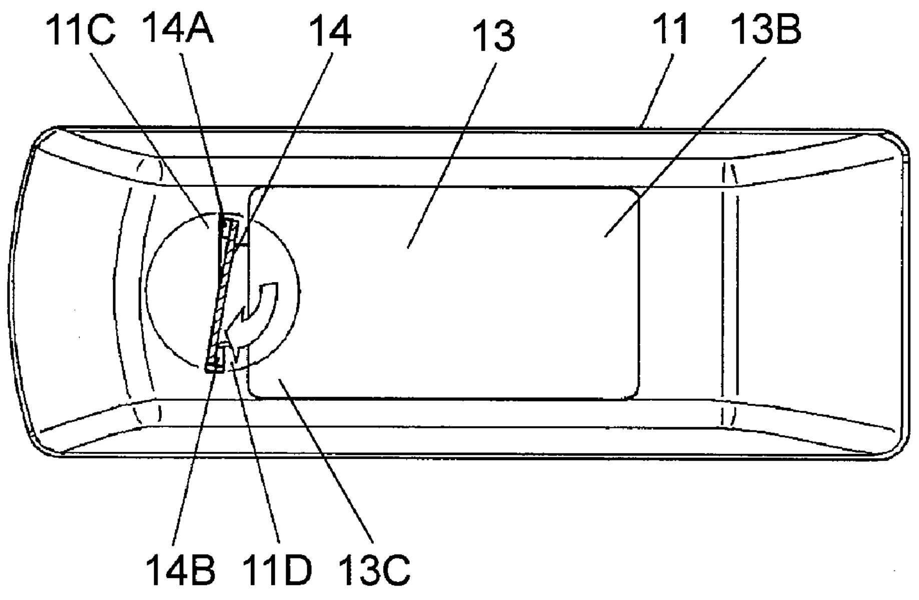
FIG. 3B shows the second plan view to explain the operation of the remote controller in accordance with the exemplary embodiment.

This action will twist and bend generally U-shaped latch-hook 14 and will release protrusions 14A and 14B provided on the symmetrical positions on the front and rear surfaces from latch-pawls 11C and 11D, on which having been engaged with resiliently, provided on inner bottom of casing 11 as shown in FIG. 3B, thus releasing the resilient engagement.

Figure 4:
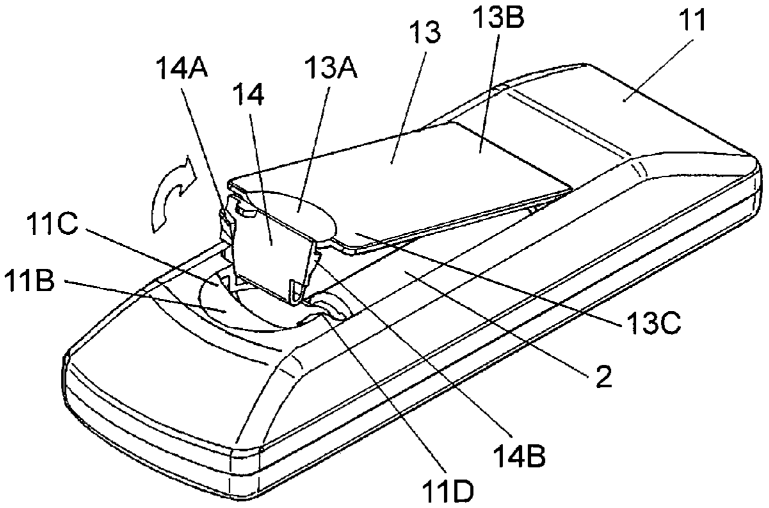
FIG. 4 shows a perspective view to explain an open-lid state of the remote controller in accordance with the exemplary embodiment.
Figure 5:
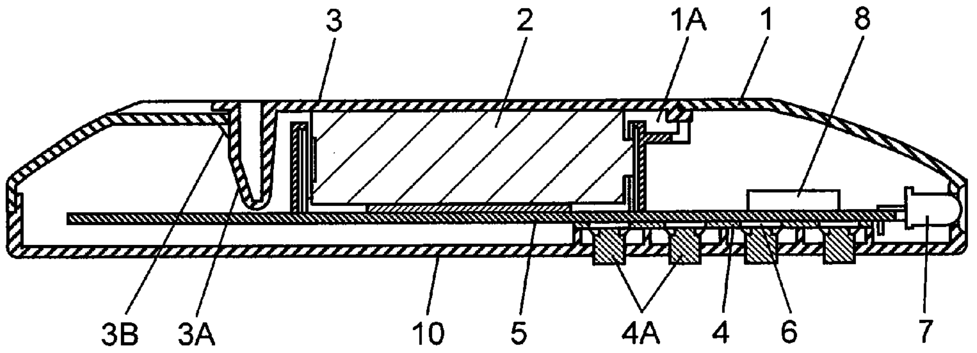
FIG. 5 PRIOR ART
FIG. 5 shows a cross-sectional view of a conventional remote controller.
Figure 6:
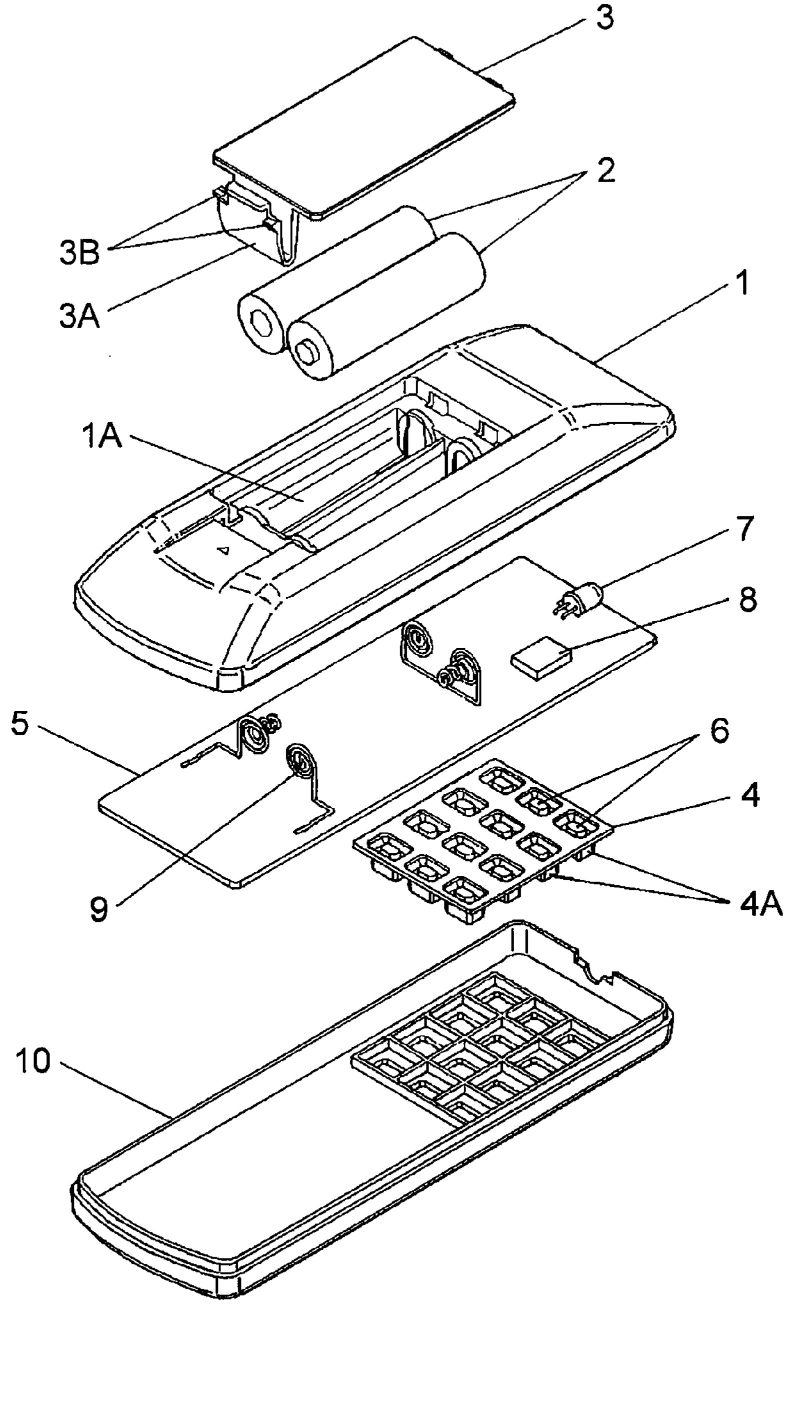
FIG. 6 PRIOR ART
FIG. 6 shows an exploded perspective view of the remote controller shown in FIG. 5.
Figure 7A:
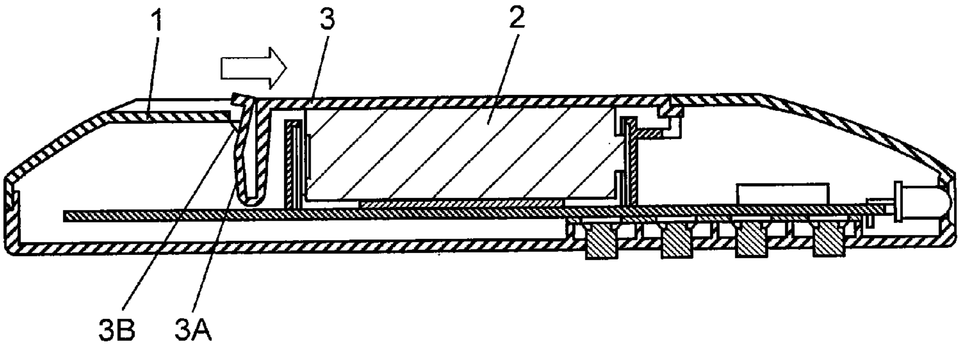
FIG. 7A PRIOR ART
FIG. 7A shows the first plan view to explain the operation of the remote controller shown in FIG. 5.
Figure 7B:
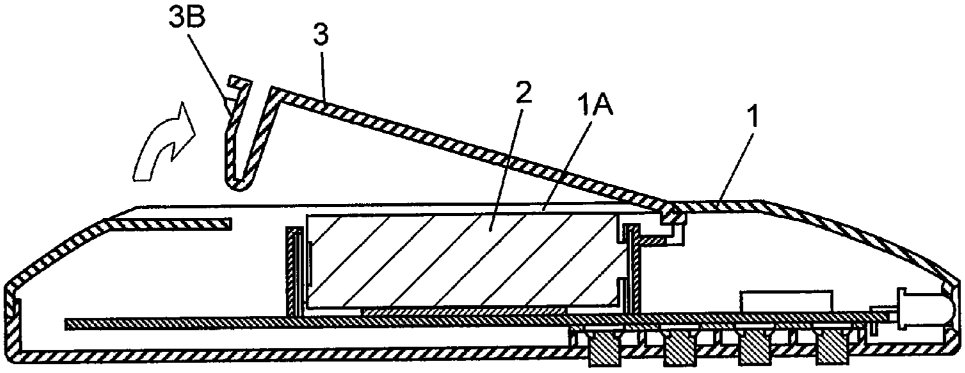
FIG. 7B PRIOR ART
FIG. 7B shows the second plan view to explain the operation of the remote controller shown in FIG. 5.

Next, lid 3 can be turned pivotally upward with its right end to act as a fulcrum keeping the edge of latch-hook 14 pinched and twisted by the two fingers as shown in the perspective view in FIG. 4. Batteries 2 housed in parallel are replaced after opening battery holder 11A.

Namely, when pressing operation panel 4 to operate electronic equipment from a distance by using the remote controller normally, a plurality of projections 14A and 14B provided on symmetric positions on the front and rear surfaces of latch-hook 14 at left end 13C of lid 13 are engaged resiliently with latch-pawls 11C and 11D provided on inner bottom of casing 11. This keeps lid 13 in closed condition. Therefore, lid 13 would never come off due to only such a degree of cause as catching a fingertip on the edge of latch-hook 14 mistakenly or applying some impact on latch-hook 14 by slipping out of fingers carelessly and therefore battery 2 would never drop off because of it.

To replace a battery, the user should turn latch-hook 14 to a given direction pinching its edge by two fingers with the rotation axis 14D to act as a center. This action will eventually twist and bend generally U-shaped latch-hook 14 to release protrusions 14A and 14B provided on lid 13 from latch-pawls 11C and 11D, and will thus dissolve the resilient engagement. The user, therefore, can open lid 13 relatively easily by turning it pivotally upward with its right end to act as a fulcrum.

Namely, since a plurality of projections 14A and 14B provided on symmetric positions on the front and rear surfaces of generally U-shaped latch-hook 14 are engaged resiliently with latch-pawls 11C and 11D provided on inner bottom of casing 11, lid 13 would never come off from casing 11 unless the edge of latch-hook 14 is pinched and twisted by two fingers. The user, therefore, can carry out remote controlling of normal equipment with lid 13 kept firmly engaged with casing 11. Additionally, to replace a battery, the user can open/close lid 13 relatively easily by just twisting latch-hook 14.

Latch-hook 14 formed generally U-shaped can bend larger entirely compared with that formed linearly. Protrusions 14A and 14B, therefore, can engage resiliently with latch-pawls 11C and 11D more strongly, resulting in a more reliable engaging with lid 13. Moreover, the user can turn latch-hook 14 with a larger amount of twisting moment.

Dents 13A and 11B, both recessed arc-shaped downward, are provided at the left end 13C of lid 13 and on the neighboring top surface of casing 11 respectively, which provides the edge of latch-hook 14 with a circularly recessed downward surrounding. Upon opening lid 13 by the procedure described above, the user can pinch the edge of latch-hook 14 with two fingers easily. Therefore, the user can open/close lid 13 more easily.

To return lid 13 again to casing 11 after the battery is replaced, it is not necessary anymore to pinch and twist latch-hook 14. That is, rotating lid 13 downward pivotally with the right end to act as a fulcrum and just pushing the left end from above will deform latch-hook 14 elastically, causing protrusions 14A and 14B to engage with latch-pawls 11C and 11D resiliently, thus enabling lid 13 to return to casing 11.

According to the exemplary embodiments of the present invention, a plurality of projections 14A and 14B provided on symmetric positions on the front and rear surfaces of latch-hook 14 are engaged resiliently with latch-pawls 11C and 11D provided on inner bottom of casing 11. This enables protrusions 14A and 14B not to come off easily from latch-pawls 11C and 11D by some force, causing lid 13 kept reliably. Furthermore, upon opening lid 13 to replace battery, the user can open/close lid 13 easily by just twisting the edge of latch-hook 14.

Generally U-shaped component is used for latch-hook 14 in the exemplary embodiment. However, any component if shaped extended downward such as U-shaped, generally V-shaped or V-shaped would be acceptable as the user can pinch the edge of latch-hook 14 to twist it easily. The present invention, however, doesn't limit to these shapes only but any shape may be acceptable if it is provided on lid 13 so as to be able to turn pivotally by twisting such as simple plate-like or H-shaped viewed from the left end 13C.

In the above, the configuration is described that a plurality of switch-contacts 6 are formed of fixed contacts on the bottom surface of wiring board 5 and movable contacts on the top surface of operation panel 4. However, the present invention can be embodied with a large variety of switch-contacts such as; generally domed movable contacts formed of conductive thin metal sheet, or a plurality of individual push-switches mounted on wiring board 5 or the like.

What is claimed is:

1. A remote controller comprising:

a casing with a battery holder provided to house batteries;

a lid to cover the battery holder of the casing and provided with a latch-hook extending downward at its end;

a switch-contact to carry out electrical switching conducted by an operation panel;

a controller to send remote signals from a transmitter in response to an electrical switching of the switch-contact;

a plurality of protrusions disposed symmetrically on a front surface and a rear surface of the latch-hook of the lid; and a plurality of latch-pawls provided on the casing internally, each of the latch-pawls disposed so as to engage with respective one of the plurality of protrusions, wherein in a condition in which each of the protrusions engages with a respective one of the latch-pawls resiliently, each of the protrusions is released from the resilient engagement with the respective one of the latch-pawls by turning the latch-hook pivotally.

2. The remote controller of claim 1, wherein an end of the lid is engaged with the casing movably pivotally.

3. The remote controller of claim 1, wherein the latch-hook is formed U-shaped.

4. The remote controller of claim 1, wherein the plurality of protrusions are disposed on point-symmetric positions on the front and rear surfaces of the latch-hook with an axis of rotation for twisting the latch-hook to act as a center.

5. A remote controller comprising:

a casing with a battery holder provided to house batteries;

a lid to cover the battery holder of the casing and provided with a latch-hook movable pivotally at its end;

a switch-contact to carry out electrical switching conducted by an operation panel;

a controller to send remote signals from a transmitter in response to an electrical switching of the switch-contact;

a plurality of protrusions disposed symmetrically on a front surface and a rear surface of the latch-hook of the lid; and a plurality of latch-pawls provided on the casing internally to engage with respective ones of the plurality of protrusions, wherein in a condition in which each of the protrusions engages with a respective one of the latch-pawl resiliently, each of the protrusions is released from the resilient engagement with the respective one of the latch-pawls by turning the latch-hook pivotally.

6. The remote controller of claim 5, wherein an end of the lid is engaged with the casing movably pivotally.

7. The remote controller of claim 5, wherein the latch-hook is formed U-shaped.

8. The remote controller of claim 5, wherein the plurality of protrusions are disposed on point-symmetric positions on the front and rear surfaces of the latch-hook with an axis of rotation for twisting the latch-hook to act as a center.

* * * * *